Patented Mar. 19, 1946

2,397,035

UNITED STATES PATENT OFFICE 2,397,035

HIGH-WATER-DISPERSIBLE CALCITE PIGMENT

Kenneth S. Mowlds, Baltimore, Md., assignor to The Glidden Company, Cleveland, Ohio, a corporation of Ohio No Drawing. Application May 23, 1942, Serial No. 444,258

2 Claims. (Cl. 106—124)

This application is a continuation-in-part of my application Serial No. 350,058, filed August 2, 1940.

This invention relates to aqueous dispersions of light-weight pigments comprising calcium carbonate and has particular reference to aqueous dispersions of these pigments wherein the concentrations of the light-weight pigments are unusually high.

Among the objects of this invention is the preparation of aqueous dispersions of light-weight pigments comprising calcium carbonate of sufficient concentration of pigment to give the desired covering and hiding powers when these aqueous dispersions are employed as coating compositions and the like.

Another object of this invention is the preparation of aqueous dispersions of light-weight pigments comprising calcium carbonate of concentrations highly in excess of the concentrations of pigments in normal aqueous dispersions of such pigments of corresponding viscosity and consistency; that is, from 2 to 5 times as much pigment as is contained in normal aqueous dispersions of such pigments of corresponding viscosity and consistency.

A further object of this invention is the preparation of these aqueous dispersions of high concentration of light-weight pigments comprising calcium carbonate in a simple, highly efficient and inexpensive manner.

A further object of this invention is the preparation of aqueous dispersions of high concentration of calcium carbonate pigment, the calcium carbonate particles being in less reactive condition and thus less prone to discoloration when employed with binders, such as the amines or proteins which have a tendency to promote discoloration and darkening.

A still further object of this invention is the preparation of these aqueous dispersions of high concentration of light-weight pigments in a form wherein the pigment will persist in dispersed state for an extraordinary length of time.

Other, further and more specific objects of this invention will become readily apparent to persons skilled in the art from a consideration of the following description:

Calcium carbonate, such as calcite, is not ordinarily dispersible in water to any great extent. If an attempt is made to prepare an aqueous dispersion of calcite, a thick paste forms with relatively small concentration of calcite. Thus, when 1200 grams of ground calcite per liter are dispersed in water, a thick paste is formed. This paste does not possess suitable working qualities to be used in paints or many other purposes and when thinned down to a proper working consistency does not possess sufficient pigment concentration to give the covering power desired in coating compositions and the like.

It is very desirable for many needs to have an aqueous calcite dispersion possessing a sufficient concentration of pigment to give satisfactory hiding and covering power. Such a dispersion is particularly desirable in aqueous coating compositions; especially, if it possesses covering power equal to or substantially equal to that of calcium sulfate, since calcite unlike calcium sulfate pigment can be mixed or slurried with water.

According to a specific embodiment of the present invention a method is provided whereby a calcite dispersion is prepared of high concentration and which has a covering power equal to or substantially equal to that of calcium sulfate. The dispersion produced has excellent working properties, the working properties being similar to those of clay. The dispersion is continuously flowing, has a high pigment concentration at working consistency, and possesses high covering and hiding power.

The dispersion may be used in various ways such as in water paints, in wallpaper and other papers. The dispersions prepared according to the present invention may also be used with protein binders such as casein and soy bean protein. Such combinations may be readily used in the preparations of water paints, paper coatings and sizing compositions.

In accordance with the present invention a water soluble phosphate is used to improve the dispersion. Any soluble phosphate may be used, such as trisodium phosphate, sodium tetra phosphate, tetra sodium pyrophosphate, etc. The pyrophosphates are preferred. The amount of phosphate may vary from 0.1% to 5%, more or less, based on the calcite present, although in some cases more may be desired if soluble alkaline earth compounds are present. The soluble alkaline earth compounds readily react with the phosphate and form insoluble alkaline earth phosphates. These precipitated alkaline earth phosphates coat the finely divided calcium carbonate particles, making the latter less reactive. When this less reactive pigment is employed in certain coating compositions, such as those employing amine or protein binders, the tendency toward precipitation of the binders is considerably reduced. In treating calcite, there should be sufficient soluble phosphate left after precipitation of alkaline earth phosphates to effect the desired dispersion of the calcite or similar pigment. This dispersing action of soluble phosphates may be used either to effect a higher concentration of calcite, or to control the viscosity of the dispersion, or both. For example, if 0.3% of $Na_4P_2O_7$ be used, 2500 grams of calcite per liter may be dispersed in water to give a thin slurry which flows like water.

The calcium carbonate or calcite treated according to my invention is particularly adapted for use with amine and protein binders. In prior processes, when calcite is employed with amine and protein binders, the extraneous water-soluble alkaline earth substances (which generally vary from 0.01 to 0.1%) react with the amine and protein binders, forming insoluble reaction products and thus "kicking" or precipitating these binders out of solution to the extent of the amount of water-soluble alkaline earth substances present.

My process eliminates this "kicking" effect and is, therefore, highly advantageous because precipitation of the binders results in:

(1) Reduction of adhesiveness of coating to the surface applied.

(2) Marked increase in the viscosity of the aqueous dispersion.

(3) Production of coarser texture of film.

The following specific examples will illustrate the practice of my invention:

*Example I*

To 100 grams of calcite there is added 0.3 gram of sodium pyrophosphate. The mixture is ground together in dry form and then introduced into about 30–35 cubic centimeters of water, forming a slurry or semi-paste.

The composition, prepared as above, gives excellent covering when used in coating wallpaper. Attempts to make a satisfactory coating for wallpaper with calcite, but without using the phosphates, have been found unsatisfactory due to the low pigment concentration and high viscosity of the attempted dispersions.

My composition, as above prepared, may be used advantageously with gelatinous binders, such as alginates, glue, casein and vegetable protein. It works well with vegetable protein derived from soy bean.

*Example II*

100 grams of ground calcite are added to about 30–35 cubic centimeters of an aqueous solution of sodium pyrophosphate, forming a slurry or semi-paste.

The preferred quantity of phosphate material is from 0.2 to 0.4%, based on the amount of pigment. The quantity of phosphate may, however, be varied from 0.1 to 5% within the scope of this invention.

For best results, I prefer to use the sodium and potassium pyrophosphates.

Another use of the calcite dispersions of the present invention is in the preparation of composite pigments containing calcite, such as a $TiO_2$-calcite composite pigment. The procedure in such a case may be to first prepare a thin dispersion of calcite in accordance with the present invention, and effect a hydro-separation of the dispersion. The effluent containing the fines may then be mixed with a $TiO_2$ slurry and the mixture coagulated with a water-soluble alkaline earth salt or other coagulating agent, and the coagulated composite separated from the water.

Also, dispersions of calcite and other $CaCO_3$ pigment prepared according to my invention, may be used with pigments other than $TiO_2$ in the preparation of composite pigments. Examples of such other pigments used in lieu of $TiO_2$ are ZnS, cadmium yellows and reds, chromates, iron blues, iron reds, iron yellows and organic pigments.

The expression "normal aqueous dispersions" as employed in the claims is intended to be construed as dispersions in water which contains no dissolved substance.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A composition of matter comprising a highly persistent aqueous dispersion of calcite pigment coated with alkaline earth phosphate material and having a concentration of pigment at least twice as great as the concentration of such pigment in normal aqueous dispersions of such pigment of corresponding viscosity, said dispersion having in solution 0.1 to 5% of a water-soluble pyrophosphate of an alkali metal based on the amount of pigment, the pyrophosphate of alkali metal being sufficient to precipitate all soluble alkaline earth compounds in the calcite and for effecting the dispersion of the coated calcite.

2. A composition of matter comprising a protein and a highly persistent aqueous dispersion of calcite pigment coated with alkaline earth phosphate material and having a concentration of pigment at least twice as great as the concentration of such pigment in normal aqueous dispersions of such pigment of corresponding viscosity, said dispersion having in solution 0.1 to 5% of a water-soluble pyrophosphate of an alkali metal based on the amount of pigment, the pyrophosphate of alkali metal being sufficient to precipitate all soluble alkaline earth compounds in the calcite and for effecting the dispersion of the coated calcite.

KENNETH S. MOWLDS.